United States Patent [19]
Watten

[11] Patent Number: 5,914,046
[45] Date of Patent: Jun. 22, 1999

[54] PROCESS AND APPARATUS FOR CARBON DIOXIDE PRETREATMENT AND ACCELERATED LIMESTONE DISSOLUTION FOR TREATMENT OF ACIDIFIED WATER

[75] Inventor: Barnaby J. Watten, Winchester, Va.

[73] Assignee: Interior, United States of America, as represented by the Secretary, Washington, D.C.

[21] Appl. No.: 08/735,134

[22] Filed: Oct. 22, 1996

[51] Int. Cl.[6] .................................................. C02F 1/20
[52] U.S. Cl. .................... 210/712; 210/718; 210/724; 210/750
[58] Field of Search ................. 210/192, 195.1, 210/218, 712, 718, 724, 743, 749, 750, 198.1, 715

[56] References Cited

U.S. PATENT DOCUMENTS

| | | | |
|---|---|---|---|
| 1,742,110 | 12/1929 | Weihe | 210/2 |
| 2,642,393 | 6/1953 | Gehmetal | 210/52 |
| 3,208,935 | 9/1965 | Nesbitt | 210/59 |
| 3,527,702 | 9/1970 | Holluta et al. | 210/59 |
| 3,617,560 | 11/1971 | Deul et al. | 210/718 |
| 3,617,562 | 11/1971 | Cywin et al. | 210/718 |
| 4,153,556 | 5/1979 | Riedinger | 210/218 |
| 4,217,217 | 8/1980 | Kayetal | 210/59 |
| 4,272,498 | 6/1981 | Faatz | 423/242 |
| 4,350,597 | 9/1982 | Selm et al. | 210/712 |
| 4,652,381 | 3/1987 | Inglis | 210/724 |
| 4,734,200 | 3/1988 | Wes Berry | 210/677 |
| 4,748,010 | 5/1988 | Walker | 423/176 |
| 5,059,407 | 10/1991 | Wallace et al. | 423/421 |
| 5,158,835 | 10/1992 | Burke | 428/703 |
| 5,164,172 | 11/1992 | Katayana et al. | 423/432 |
| 5,484,535 | 1/1996 | Downs | 210/724 |
| 5,487,835 | 1/1996 | Shane . | |
| 5,509,999 | 4/1996 | Lindberg | 210/712 |
| 5,525,224 | 6/1996 | Funahashi et al. | 210/205 |

*Primary Examiner*—Jay H. Woo
*Assistant Examiner*—Betsey J. Morrison
*Attorney, Agent, or Firm*—Reed Smith Shaw & McClaw LLP

[57] ABSTRACT

The method of reducing the acidity in effluent discharges comprises charging the effluent with carbon dioxide, intermittently fluidizing and expanding at least one pulsed limestone bed with the charged effluent, treating the charged effluent with the limestone in the bed, displacing the limestone treated effluent with untreated charged effluent, stripping excess carbon dioxide from the effluent after treatment in the limestone bed, and discharging the limestone treated effluent. The method includes treating the charged effluent in the limestone beds for preferably at least two minutes, more preferably about 4 to 8 minutes. The step of intermittently fluidizing and expanding at least one pulsed limestone bed with the charged effluent includes generally concurrently intermittently fluidizing and expanding at least one other pulsed limestone bed with charged effluent, so that each limestone bed is expanded and fluidized alternately. The method also includes decreasing limestone bed sensitivity to limestone armoring by the intermittent fluidizing of the limestone beds and raising the pH of the treated effluent to at least 5. The mineral acidities in the effluent in excess of about 1,000 mg/l are neutralized and stripped $CO_2$ can be vented into the atmosphere or into untreated or partially treated effluent. The charging of the effluent takes place in at least one stage, and the stripping of the $CO_2$ takes place in at least one stage. The apparatus for the acid reduction method is also disclosed.

15 Claims, 12 Drawing Sheets

PROCESS AND APPARATUS FOR CARBON DIOXIDE PRETREATMENT AND ACCELERATED LIMESTONE DISSOLUTION FOR TREATMENT OF ACIDIFIED WATER

FIELD OF THE INVENTION

The present invention relates in general to a process and apparatus designed to treat water degraded by acid mine drainage (AMD) and industrial or chemical manufacturing processes; and, more particularly, to a process and apparatus for carbon dioxide pretreatment and accelerated limestone dissolution for treatment of acidified water.

BACKGROUND OF THE INVENTION

Industrial, chemical and mining processes resulting in acid deposition have had a significant negative effect on aquatic resources in North America, including the loss of important commercial and recreational fisheries. Direct effects of acidification on fish include acute mortality, reproductive failure, altered growth rates, and chronic impairment to body organs and tissues. Negative indirect effects of acidification include fish habitat degradation, increase in concentrations of soluble toxic metals, such as aluminum, and changes in predator-prey relationships. Within the coal deposit regions of Appalachia and the Ohio River Basin, acid mine drainage (AMD) contributes significantly to acid deposition in surface waters. [See Table 1 below.]

TABLE 1

Miles of streams degraded by AMD in the Appalachian coal region (Pennsylvania Department of Environmental Protection, 1995)

| State | Miles |
| --- | --- |
| Pennsylvania | 2594 |
| West Virginia | 1900 |
| Maryland | 156 |
| Ohio | 852 |
| Kentucky | 1129 |
| Virginia | 101 |
| Tennessee | 698 |
| Alabama | 626 |

In Pennsylvania alone, AMD has degraded 2,600 miles of streams resulting in an annual loss of revenues associated with sport fishing of 67 million dollars. Given the severity of the problem and associated environmental/economic ramifications, the National Biological Service (NBS) in February 1995 signed the statement of Mutual Intent for "Restoration and Protection of Streams and Watersheds Polluted by Acid Mine Drainage from Abandoned Coal Mines," put forth by the Office of Surface Mining and the Environmental Protection Agency. Work has been done to increase the understanding and application of the best technologies available for remediating and preventing mine drainage and to support the development of new technologies.

Acid mine drainage (AMD) results from the dissolution of pyrite and its subsequent oxidation to sulfuric acid:

$$FeS_2 + H_2O + 3.5\ O_2 \rightarrow FeSO_4 + H_2SO_4 \tag{1}$$

Sulfuric acid dissolves aluminum, manganese, zinc, and copper from soil, and thus drainage is not only highly acidic but it may contain toxic metallic ions. Mitigation of AMD is typically achieved through direct addition of alkaline materials followed by clarification. High costs, however, limit widespread application of treatment. For example, with currently available technology, it has been estimated that 15 billion dollars will be required to correct AMD-related problems in Appalachia and 5 billion dollars in Pennsylvania. Alkaline materials used to treat acidified water include anhydrous ammonia, sodium hydroxide, sodium carbonate, calcium hydroxide, calcium oxide, and limestone. Limestone is a shaly or sandy sedimentary rock composed chiefly of calcium carbonate. Use of limestone (calcium carbonate) is desirable given its relatively low cost and widespread availability. Moreover, limestone is less caustic than alternative reagents; thus, use of limestone reduces the hazards of handling and application. Limestone dissolution also provides calcium ions needed to reduce the toxicity of certain dissolved metals. However, limestone use is restricted to sites with low acidities due to the slow dissolution (acid neutralizing) rates and problems associated with the development of a metal hydroxide coating of the limestone particles (armoring).

A variety of processes and apparatus designs using calcium carbonate have been developed in an attempt to treat effluent acidity.

In U.S. Pat. No. 4,272,498, Faatz discloses a non-mechanical method of converting coarsely ground limestone to a very fine powder. A slurry of this ground limestone is then contacted with carbon dioxide gas at high pressure to convert the solids in the slurry to an unstable form. The carbon dioxide pressure is instantaneously released to form a slurry of activated calcium carbonate particles substantially reduced in size. The activated calcium carbonate slurry is then used to scrub flue gases.

In U.S. Pat. No. 2,642,393, H. W. Gehm et al. discloses a neutralizing unit for a plant or system for the neutralization of acidic liquids. The arrangement effects an upflow of acid waste through a filter bed of a neutralizing agent of solid particles that are maintained in suspension and continually agitated. Air is used to affect a further suspension and agitation of the limestone particles, but does not chemically effect the reaction between the effluent and the limestone. There is no disclosure of carbon dioxide pretreatment of the effluent to increase limestone dissolution, pulsed bed technology which decrease the system's sensitivity to limestone armoring, or the recycling of $CO_2$ gas.

In U.S. Pat. No. 1,742,110, C. R. Weihe discloses the use of a neutralizing agent to be maintained in contact with the running stream of waste water in such a way that the treating agent does not pass out with the waste water in the stream. The invention is particularly adapted for use in connection with neutralizing waste waters from mines, mills, and factories before it enters streams, lakes or rivers.

In U.S. Pat. No. 3,527,702, Holluta et al. disclosed a method of removing carbon dioxide from water using Portland cement clinkers or set hydraulic cements which consist of calcium oxide, silica and iron-aluminum oxides.

In U.S. Pat. No. 4,153,556, Riedinger discloses an apparatus for conditioning "aggressive" demineralized brackish water or sea water to remove $CO_2$ and raise the pH to about 8. A wide angle, low pressure (approximately 10–20 psi) spray nozzle is used to supply purified aggressive water to the system so that it can percolate up through the limestone bed and pass out through an outlet pipe to a final conditioned water storage tank.

In U.S. Pat. No. 5,158,835, Burke discloses blocks weighing about 35 lbs., formed of a homogenous mixture of about 75% gypsum and 25% lime. The blocks are strategically placed in surface water that is being damaged by acid rain and where by timed release of lime, the pH of the water is maintained at about 6.5.

In U.S. Pat. No. 5,484,535, Downs discloses a method for treating effluent seawater including aerating the effluent seawater in an aeration pond. The aerated effluent seawater is then channeled back to the fresh seawater source. Fresh limestone is added periodically to the bed and the size of the bed is varied depending on the amount of effluent seawater to be treated.

In U.S. Pat. No. 5,487,835, Shane discloses a method and apparatus for controlling the pH of a water stream using carbon dioxide. Carbon dioxide at a selected pressure and flow rate is mixed with the carrier water also at a selected pressure and flow rate. The carbon dioxide-carrier water mixture is injected into the water stream, which is at a lower pressure, allowing the carbon dioxide to come out of the solution, contact the water stream and correspondingly adjust the pH of the water stream.

In addition, a variety of apparatus designs have been used to dose AMD with calcium carbonate. These include a rotary drum, electric powered dosers, packed beds, and a diversion well. The diversion well has been applied with relatively low initial capital and maintenance costs at several Pennsylvania AMD sites. The diversion well is designed to establish a fluidized bed of crushed limestone 6–25 mm in diameter. Fluidization occurs within a cylindrical well that receives water through a centrally located down pipe discharging water at the bottom of the well. The diverted water flows upward through the limestone with sufficient force to agitate and fluidize the medium causing abrasion of the aggregate for enhanced dissolution. Although the device provides low total costs of treatment, treatment effect is severely limited by the use of relatively large aggregate diameters and high required hydraulic loading rates. The large aggregate diameters are used to circumvent problems such as a slow dissolution rate, associated with metal hydroxide coating of the limestone. This coating or armoring of the medium occurs rapidly when treating waters with high ferrous iron ($Fe^{++}$) concentrations.

Therefore, in spite of numerous attempts to restore water degraded by acid mine drainage and industrial chemical processes, there still remains a need for an improved process and apparatus using carbon dioxide pretreatment of the effluent to accelerate limestone dissolution with subsequent recycling of the $CO_2$ gas stripped or recovered from water exiting the apparatus.

SUMMARY OF THE INVENTION

The present invention is a method of using a intermittently fluidized (pulsed) limestone bed system incorporating carbon dioxide pretreatment to enhance restoration of acidified water from acid mine drainage and chemical industrial processes.

The method for reducing acidity in effluent discharge comprises charging the effluent with $CO_2$, intermittently fluidizing and expanding at least one pulsed limestone bed with the charged effluent, treating the charged effluent with the limestone in the bed, displacing the limestone treated effluent from the bed with untreated charged effluent, stripping excess $CO_2$ from the effluent after treatment in the limestone bed, and discharging the limestone treated effluent. The method includes treating the $CO_2$ charged effluent in the limestone bed for preferably at least two minutes, more preferably about four to eight minutes. The charging of the untreated effluent is done in at least one stage. The stripping of $CO_2$ from the treated effluent is done in at least one stage. The stripped $CO_2$ can be recycled to the untreated effluent, and the treated effluent can be recycled to the untreated effluent or partially treated effluent. The step of intermittently fluidizing and expanding at least one pulsed limestone bed with charged effluent includes generally concurrently intermittently fluidizing and expanding at least one other pulsed limestone bed with charged effluent, whereby each limestone bed is expanded and fluidized alternately. The method further includes alternating between the limestone bed sets after preferably at least two minutes of treatment in one bed set, more preferably about four to eight minutes. The method includes introducing charged effluent at rates that exceed particle size dependent minimum fluidization velocities during expansion of the limestone beds. The method includes decreasing the limestone bed sensitivity to limestone armoring. The method includes raising the pH of the treated effluent to at least 5. Mineral acidities in excess of 1000 mg/l as $CaCO_3$ have been neutralized.

The apparatus for reducing the acidity in effluent discharges comprises means for charging the effluent with $CO_2$, means for intermittently fluidizing and expanding at least one pulsed limestone bed with the charged effluent, means for treating the charged effluent in the limestone bed, means for displacing the limestone treated effluent from the bed with untreated charged effluent, means for stripping excess gas from the effluent after treatment in the bed, and means for discharging the limestone treated effluent. The apparatus includes means for treating the charged effluent with the limestone in the beds for preferably at least two minutes, more preferably about four to eight minutes. The apparatus includes means for generally concurrently intermittently fluidizing and expanding at least one other pulsed limestone bed with charged effluent, whereby each pulsed limestone bed is fluidized alternatively. The apparatus further includes means for alternating between the limestone beds after preferably at least two minutes of treatment, more preferably about 4 to 8 minutes. The apparatus also includes means for venting stripped $CO_2$ into the atmosphere, and means for recycling said treated effluent into said untreated effluent or partially treated effluent. The apparatus also includes means for charging said untreated effluent in at least one stage and stripping said $CO_2$ from said treated effluent in at least one stage. The apparatus also includes means for replacing the limestone in at least one bed.

It is an advantage of this method to accelerate limestone dissolution rates by increasing dissolved carbon dioxide concentrations and to decrease the treatment systems sensitivity to limestone armoring by intermittent fluidization of the limestone beds. Other advantages include the ability to enhance rates of biological productivity in acidified impaired waters, improve the efficiency and reduce the cost of limestone beds for the treatment of acid drainages, to increase the hardness and alkalinity of very soft waters, to make acid drainage suitable for development of aquaculture production, and to obtain the release of calcium ions from calcium carbonate to reduce the toxicity of certain dissolved metals.

The invention will be more fully understood from the following description of the invention and references to the illustration and appended claims hereto.

BRIEF DESCRIPTION OF THE DRAWINGS

In the accompanying drawings, preferred embodiments of the invention are illustrated by way of example only, wherein.

DESCRIPTION OF THE PREFERRED EMBODIMENT

Figure 1:
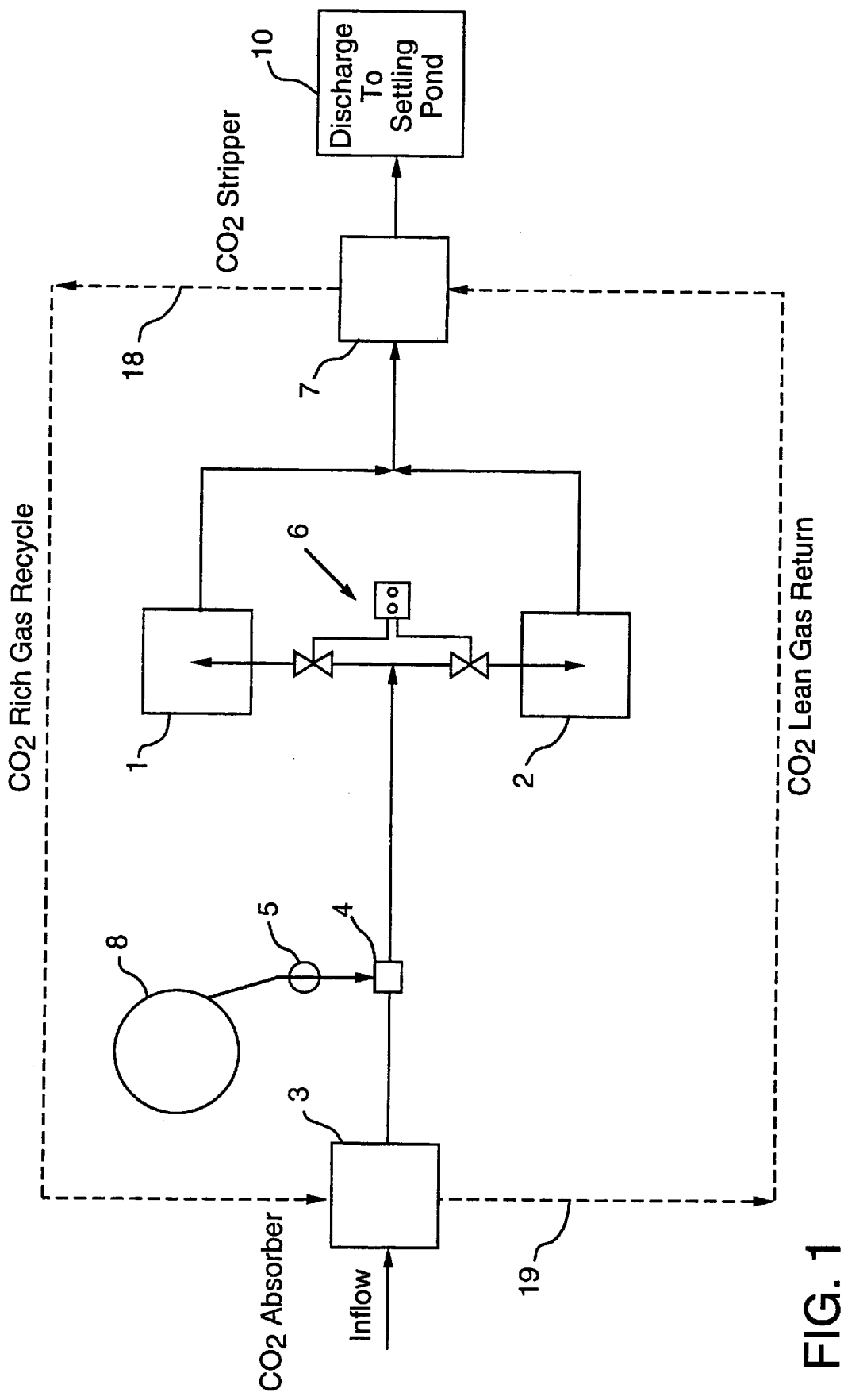
FIG. 1 is a schematic of flows through a pulsed bed system incorporating carbon dioxide pretreatment for enhanced restoration of acid mine drainage.

The rate of limestone dissolution is related to particle size, composition, turbulence, temperature, water chemistry, and the presence or absence of metal hydroxides or precipitates that tend to coat the stone. The rate of limestone ($CaCO_3$) dissolution is accelerated when inlet water acidity $H^+$ is high as shown in (2)

$$CaCO_3 + H^+ \rightarrow Ca^{+2} + HCO_3^- \quad (2)$$

and when aggregate size is small.

In equation form the dissolution rate is expressed as (3)

$$-\frac{dm}{dt} = \left(\frac{D}{\Delta r} \cdot [H^+] + k_2[CO_2] + kW - kB \cdot [Ca^{+2}][HCO_3^-]\right) \cdot \frac{3 \cdot m}{p \cdot r} \quad (3)$$

wherein:

| −dm/dt | = | Change in limestone mass with time |
| D | = | Difusivity |
| Δr | = | Thickness of boundary layer |
| [ ] | = | Ion concentration |
| $k_2$ | = | Rate constant, reaction with carbon dioxide |
| kW | = | Rate constant, reaction with water |
| kB | = | Rate constant, backward reaction rate |
| m | = | Mass |
| p | = | Particle density |

Inspection of Eqn (3) reveals dissolution of calcium carbonate is accelerated at low inlet pH, high free carbon dioxide concentrations, and when aggregate size is small. Reducing particle size within a conventional diversion well, however, reduces significantly the flow required for fluidization, (Vmf). The correlation is provided by (4)

$$Vmf \cong \frac{\mu}{P \cdot Deq} \cdot \left(33.7^2 + 0.0408 \cdot Deq^3 \cdot \frac{P \cdot (Pp - P) \cdot g}{\mu^2}\right)^{0.5} - \frac{33.7 \cdot \mu}{P \cdot Deq} \quad (4)$$

wherein:

| p | = | Particle density |
| P | = | Density of water |
| vmf | = | Minimum fluidization velocity |
| $\mu$ | = | Viscosity |
| Deq | = | Equivalent diameter |
| Pp | = | Density of particle of media |
| g | = | Acceleration due to gravity |

Based on Eqn (4) reducing particle diameter from 1.5 mm to 0.7 mm, for example, decreases Vmf by about 70%. This response, in turn, limits the turbulence and interparticle collision forces needed to inhibit armoring. To circumvent the problems associated with small particle sizes, pulsed-bed technology is used in the present invention. Pulsed-beds are defined as intermittently fluidized limestone beds.

To accelerate limestone dissolution rates, commercial carbon dioxide gas is dissolved into the AMD prior to treatment (all or part as in the case of effluent recycle). The carbon dioxide is obtained from a commercial source, a carbon dioxide generator or is recycled from the pulsed bed effluent or a combination of more than one of the sources listed. Absorption of carbon dioxide will increase reaction rates through temporary development of high carbon dioxide concentrations and reduced pH (Eqns (3), (5) and (6)):

$$H_2O + CO_2 \rightleftharpoons H_2CO_3 \rightleftharpoons H^+ HCO_3^- \quad (5)$$

$$CaCO_3 + H_2O + CO_2 \rightarrow Ca^{2+} + 2HCO_3^- \quad (6)$$

The effect of free carbon dioxide on pH is described by the Henderson Hasselbalch equation (7).

$$pH = pK_1 - \log\frac{[CO_2]}{[HCO_3^-]} \quad (7)$$

wherein:

| pH | = | Negative log of hydrogen ion activity |
| $pK_1$ | = | Negative log of the disassociation constant |

With an inlet alkalinity of 0.5 mg/l, increasing the free carbon dioxide concentration from 5 to 50 mg/l lowers the pH from about 5.4 to 4.5 mg/l. This change in pH will increase reaction rates approximately 3.5 fold. This data shows that dissolved carbon dioxide is a performance control variable or accelerant of limestone dissolution, particularly when the mine drainage has moderate pH and acidity levels or when high levels of the reaction product ($HCO_3^-$)

are required for treatment. High levels of $HCO_3^-$ allow for side-stream treatment and hence a reduction in reactor size given the ability of $HCO_3^-$ to react with acids (8):

$$HCO_3^- + H^+ \rightarrow CO_2 + H_2O \qquad (8)$$

Carbon dioxide levels in water are increased through reaction as shown in Eqn (8) and through development of appropriate gas-liquid interfacial area and along with control of the dissolved gas deficit. The gas deficit represents the difference between the saturation concentration of $CO_2$ in the water ($C^*$) and the ambient concentration. The $C^*$ of $CO_2$ is determined by its partial pressure in the gas phase, water temperature, and water composition as related by Henry's Law (9)

$$C^* = B_i k_i 1000 \left[ \frac{X_i(TP - VP)}{760} \right] \qquad (9)$$

wherein:

| | | |
|---|---|---|
| $C^*$ | = | Saturation concentration of a gas in water |
| $B_i$ | = | Bunsen solubility coefficient |
| $K_i$ | = | Ratio of molecular weight to molecular volume |
| $X_i$ | = | Mole fraction of gas in the gas phase |
| TP | = | Total pressure |
| VP | = | Water vapor pressure |

The $CO_2$ absorption and stripping equipment used in the process alters $C^*$ by changing system pressure and the mole fraction ($X_i$) of $CO_2$ in the gas phase. The apparatus allows for capture and reuse of carbon dioxide present in the systems effluent to minimize carbon dioxide requirements and maximize effluent pH (Eqn (7)).

In operation, a valve assembly intermittently directs water into a small particle size (range about 0.05 to about 25 mm Deq (equivalent diameter)) bed of limestone, so as to expand the bed and allow for bed turnover and contraction (setting). A particle size close to fine sand has been used with the following particle size distribution.

TABLE 2

| RETAINED ON STANDARD US SIEVE NO. | PERCENTAGE PASSING |
|---|---|
| 8 | 0 |
| 10 | 0 |
| 20 | 8.2 |
| 40 | 63.3 |
| 60 | 24.9 |
| 100 | 2.6 |
| 270 | 1.0 |

During bed expansion, water is introduced at a hydraulic loading rate that provides upflow velocities in the limestone bed that exceed the minimum fluidization velocity (Vmf, Eqn (4)) by a factor greater than 1.0, providing for high levels of particle attrition and turbulence. Water flow is interrupted prior to the expansion of the bed into the effluent. Altering the extent of the settling period allows for control of retention time/treatment effect. Control of this type is needed when AMD composition and flow varies seasonally. It is intended that metal precipitates such as iron hydroxide that often form during treatment will be purged from the reactor by the movement of the AMD through the limestone bed.

As the acidity of AMD is reduced by exposure to limestone within a reactor, the rate of acid neutralization slows rapidly (Eqn (3)) making it difficult to achieve needed changes in water chemistry (pH, acidity, alkalinity). The method and apparatus of the present invention avoids this problem by incorporating a unique carbonation pretreatment step. Here, the transfer of carbon dioxide into the AMD prior to or during treatment increases the rate of limestone dissolution through temporary development of high free carbon dioxide concentrations and increased acidity (lowers pH). The high free carbon dioxide concentrations encourage the dissolution of limestone via the reaction given as (6) hereinabove, and the product of the reaction ($HCO_3^-$) is then available for acid neutralization as shown above in Eqn (8). This neutralization can occur within the water treatment system or, in the case of side stream treatment, it can occur at the point where treated water is mixed with AMD.

The carbon dioxide pretreatment step accelerates gas absorption by exposing the AMD to a gas with a partial pressure of carbon dioxide that exceeds dissolved carbon dioxide tensions in the AMD, and by establishing gas-liquid interfacial area needed for gas transfer. For example, exposing water to carbon dioxide at a pressure of 100 psi (gage) can increase the carbon dioxide saturation concentration ($C^*$, Eqn (9)) by a factor of about 22,000. It is understood that gas-liquid interfacial area can be created by a number of reactor types (e.g. U-tubes, spray columns, packed beds, gas spargers, surface agitators, perforated trays), stages, and that the gas-liquid contacting can take place at pressures above, at, or below local atmospheric pressures. Following treatment in the limestone bed, the apparatus allows for capture and reuse of carbon dioxide not utilized in the first pass through the system or that generated during acid neutralization (Eqn (8)) as shown in FIGS. 1–4, so as to minimize makeup gas requirements and maximize effluent pH. It is understood that the degree of recovery of the carbon dioxide from the AMD exiting the limestone beds can be varied from zero percent to rates approaching one hundred percent, depending on equipment design, operating costs and desired AMD treatment effects. An alternate unillustrated embodiment can have just one pulsed limestone bed.

In FIG. 1, a timer-relay valve assembly 6 directs carbon dioxide charged effluent into small particle size (0.2 mm) beds 1 and 2 of limestone intermittently so as to expand the beds and allow for bed turnover and contraction (settling). Using two beds with equal on-off periods of flow provides for an uninterrupted supply of treated water exiting the apparatus 10. During bed expansion, water is introduced at a rate that exceeds Vmf (Eqn (4)) by a factor greater than 1.0 to ensure high levels of particle attrition and turbulence. Water flow is interrupted prior to bed carry over in the effluent, although it is understood that limestone dust, fines and particles that have been reduced in size due to chemical reaction (dissolution) will be present in the limestone bed effluent, but at low concentrations. Altering the extent of the settling (contraction) period and the duration and rate of the fluidization period allows for control of retention time, hydraulic head requirement, the mass of limestone available for AMD treatment, and apparatus performance. Carbon dioxide from the stripper 7, and carbon dioxide from a liquid carbon dioxide storage tank 8 that provides carbon dioxide gas under pressure to the gas regulator 5, is in the two absorbers 3 and 4 dissolved in the inflowing AMD. After the AMD has passed through the pulsed bed reactors, it is directed through the carbon dioxide stripper 7 for removal of surplus carbon dioxide. A carrier gas or gas mixture such as air is used to pick up and carry away carbon dioxide stripped from the effluent. The carbon dioxide enriched gas is routed through a closed conduit 18 to preclude dilution of the carbon dioxide with the surrounding atmosphere. Upon entering the carbon dioxide absorber 3, the carbon dioxide concentration in the carrier gas is reduced as the carbon dioxide is transferred into the inflowing AMD. In the example, the carbon dioxide lean gas mixture exiting the absorber is routed through a second closed conduit 19 back to the carbon dioxide stripper 7 to pick up additional carbon dioxide. Gas flows between the absorber and stripper may be forced with a blower, compressor, or fan. It is well known in the art that gas absorber and stripper performance will be influenced by gas circulation rates, e.g. in packed-bed applications air flow rates used for carbon dioxide stripping are often 2–10 times the water inflow rate on a volumetric basis ($m^3$/min). The gas absorber and strippers used are designed to isolate treatment system gases from the atmosphere so as to conserve carbon dioxide although it is understood that some venting may be required to control gas pressure or volume. Water exiting the stripper 7 is routed through a settling pond 10 to allow metal precipitates forming in the AMD during and after treatment to be separated from the water by gravitational forces before the AMD is discharged into receiving waters.

Figure 2:
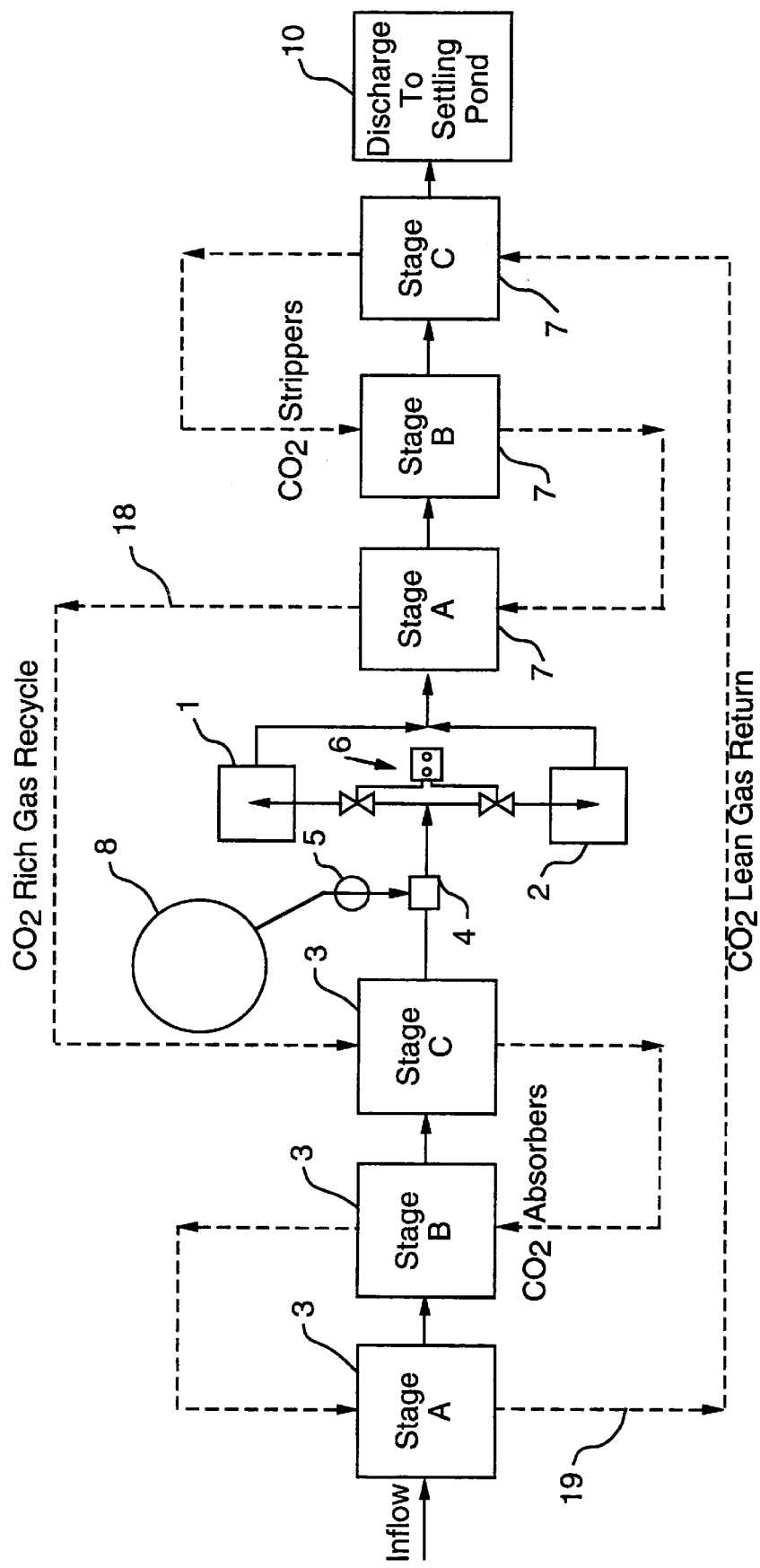
FIG. 2 is a schematic of flows through a pulsed bed system incorporating carbon dioxide pretreatment using a three-stage absorber and a three-stage stripper with counter current gas and liquid flows.
Figure 3:
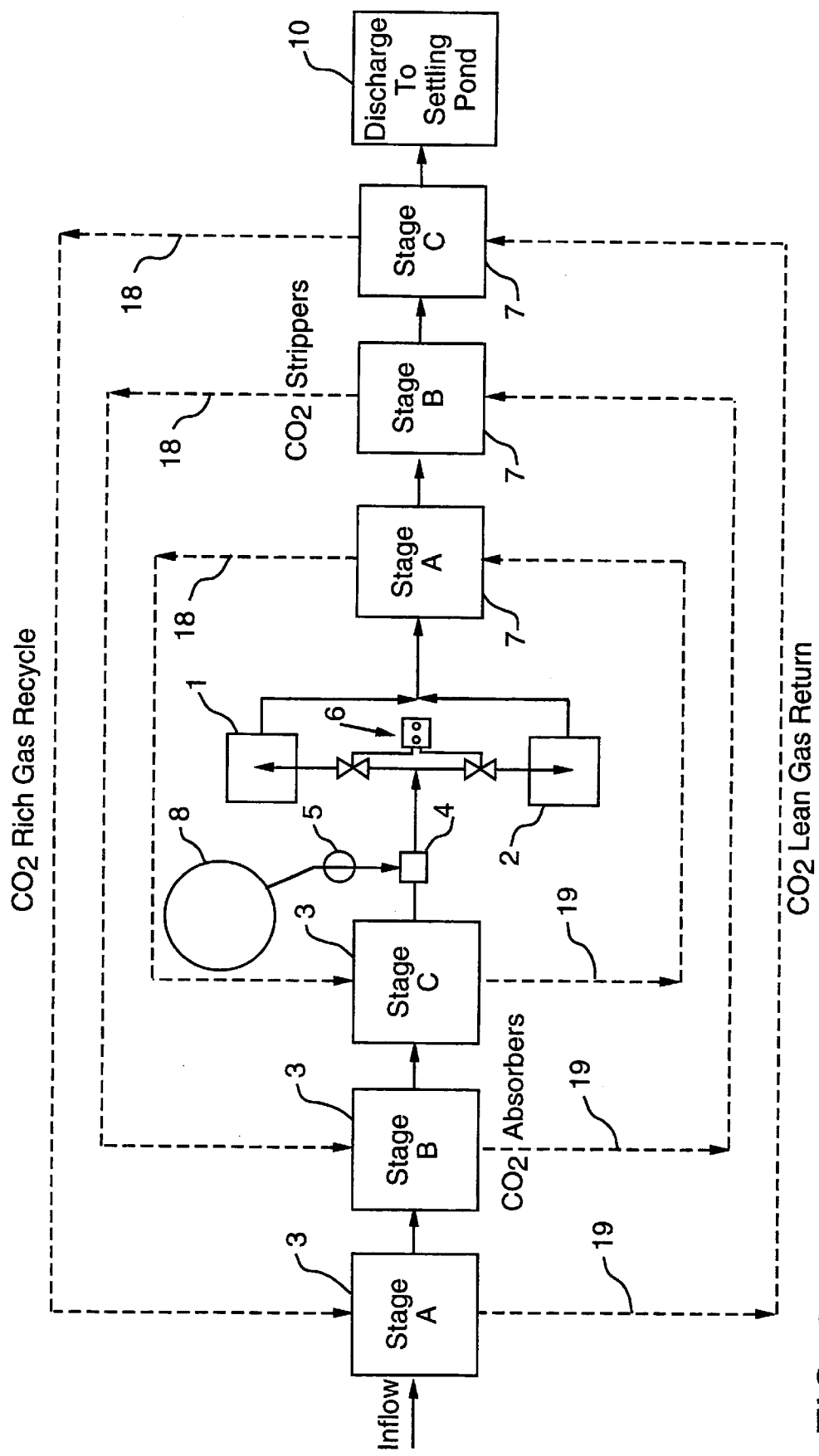
FIG. 3 is a schematic of flows through a pulsed bed system incorporating carbon dioxide pretreatment using individual absorber and stripper stages paired and coupled with individual $CO_2$ rich and lean gas lines.
Figure 4:
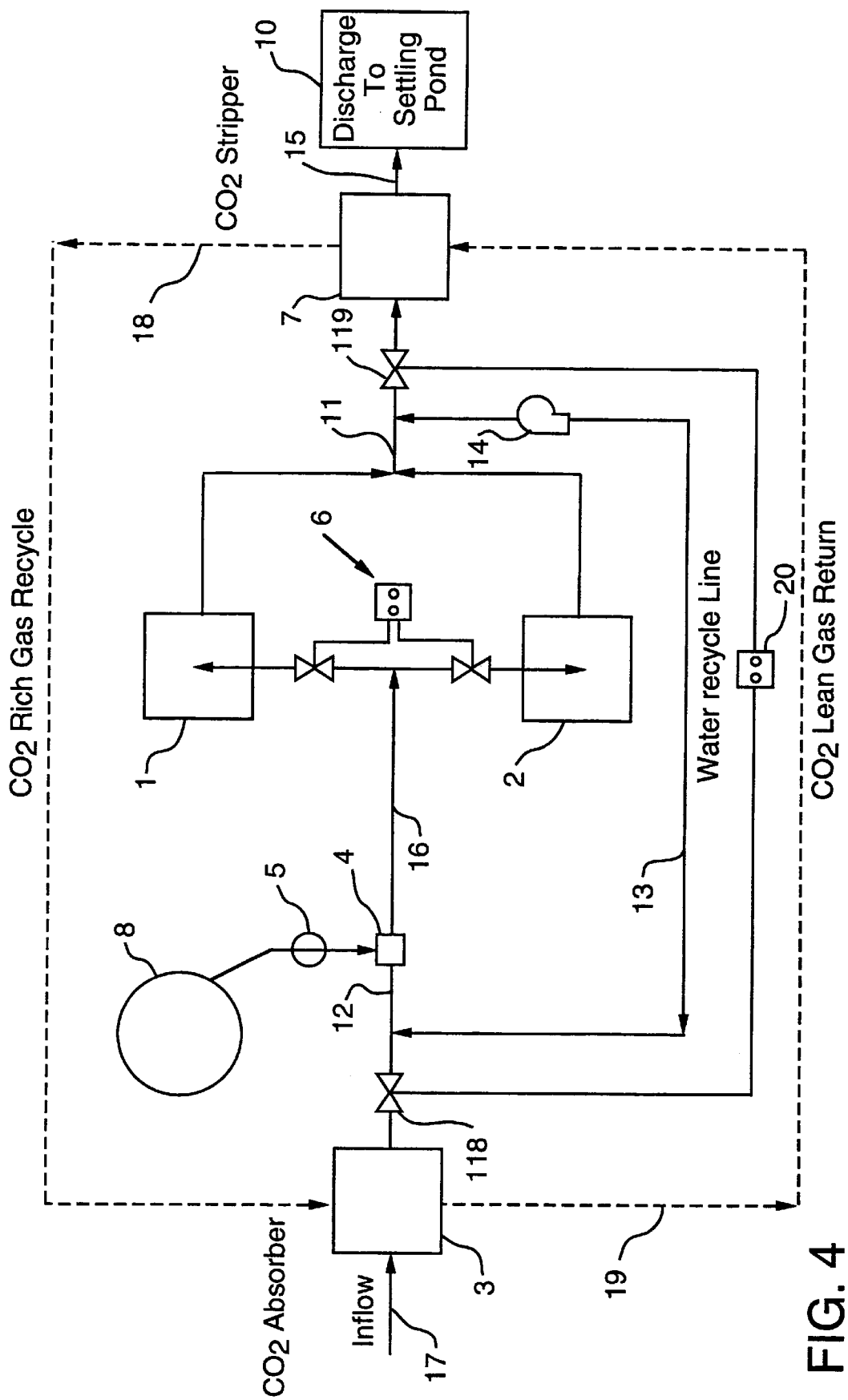
FIG. 4 is a schematic of flows through a pulsed bed system incorporating carbon dioxide pretreatment and recycle of effluent exiting the pulsed limestone beds.
Figure 5:
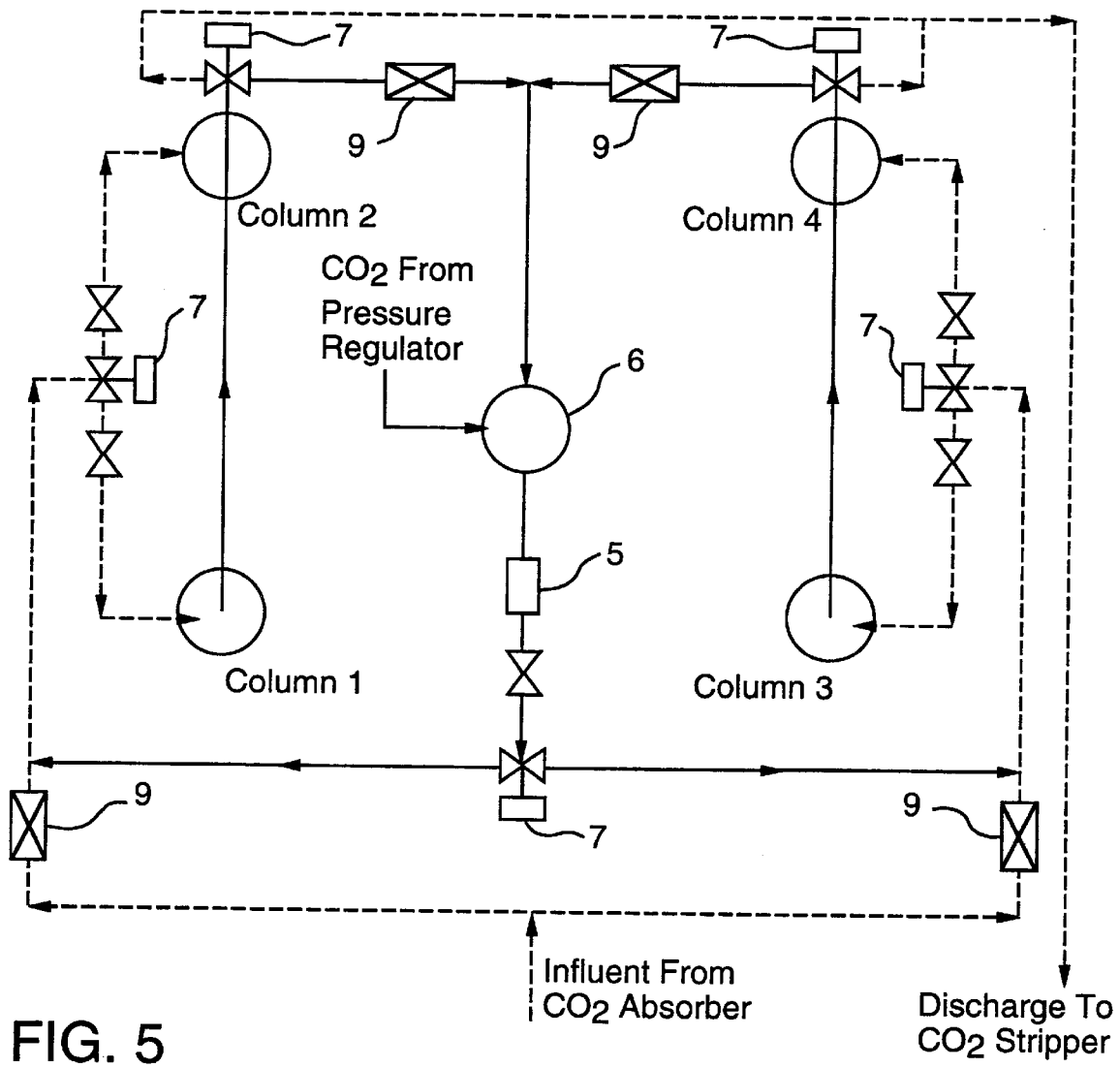
FIG. 5 shows the major components of the test system incorporating carbon dioxide pretreatment, two pairs of limestone beds and recycle of pulsed limestone bed effluent. All motorized valves are controlled by a single time-based electronic controller.
Figure 6:
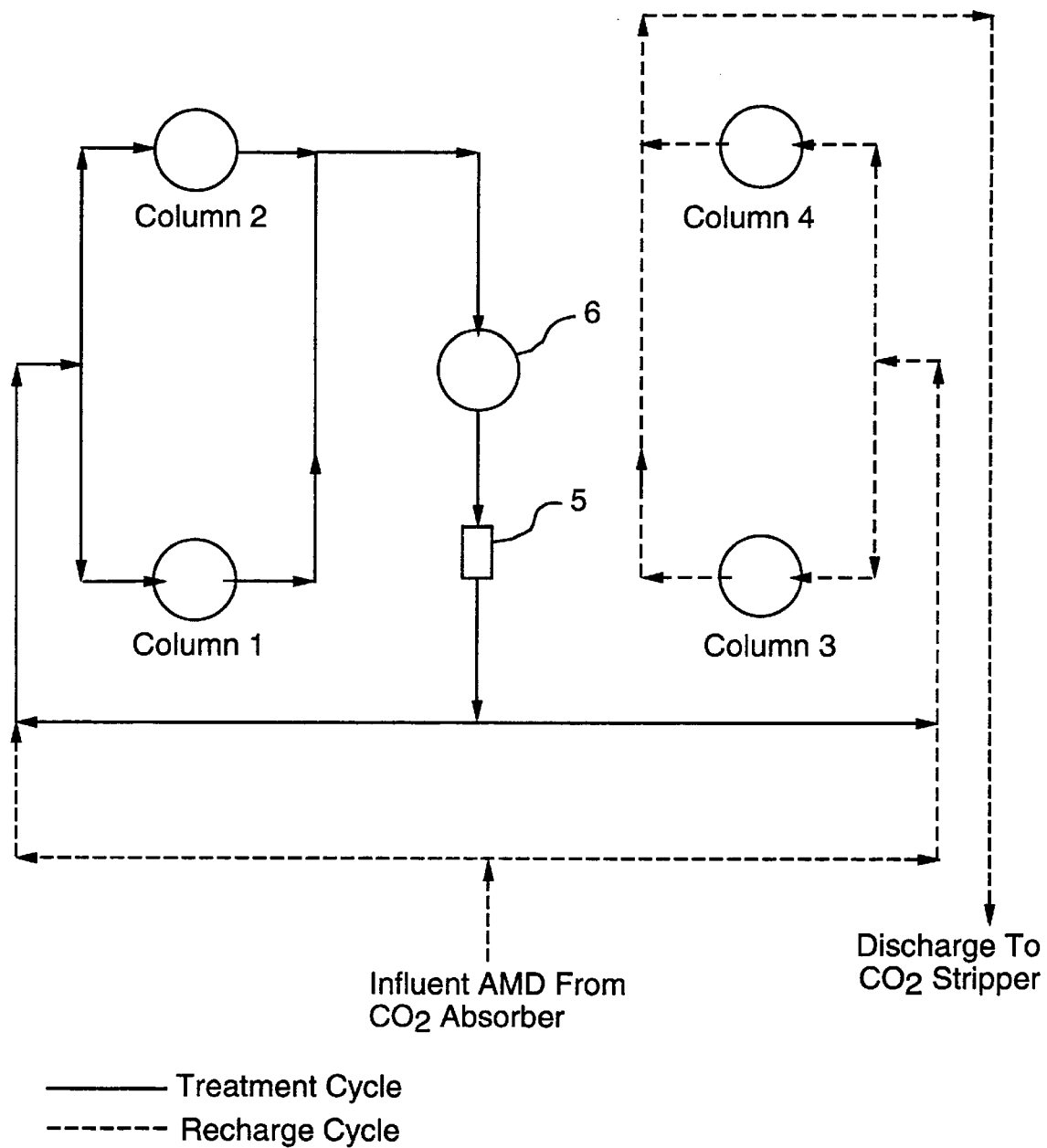
FIG. 6 is a schematic of treatment and recharge cycle flows that occur concurrently within the test limestone dissolution system.

FIGS. 2 and 3 show examples of absorber-stripper configurations that can be used in the AMD treatment process to improve the efficiency of the carbon dioxide pre and post treatment steps, i.e. staging of the gas transfer equipment and circulating gas in closed conduits to establish counter current gas-AMD flows (FIG. 2) or absorber-stripper pairs (FIG. 3). FIG. 4 gives the schematic of gas and liquid flows in the preferred embodiment of the treatment process. Here, AMD exiting the limestone beds 11 is routed back to the limestone bed influent line 12 through a pumped 14 water recycle line 13 to increase water retention time in the treatment system beds 1 and 2. An alternative location for picking up the AMD to be recycled includes the discharge of the carbon dioxide stripper 15. Alternative points for reintroducing the recycled AND are marked 16 and 17. Water recycle rates can be varied to control water retention time or treatment effect. Introducing partially treated water into the limestone beds with the recycle system in operation can reduce the effective concentration of dissolved metals such as iron that the limestone is exposed to and hence, can reduce the potential for armoring of the limestone particles. With AMD recycle, closing valves marked 118 and 119 with a controller 20 allows for system operating pressures to exceed local barometric pressures when closed conduits are used to route liquid flows and when the limestone beds are constructed as pressure vessels. With this configuration, operating pressures within the recycle loop can reach carbon dioxide (make up) feed line 5 pressures. Feed line pressures are determined by liquid carbon dioxide tank pressure and pressure drop through the required pressure regulator, flow control valve and gas lines 5. Typically, pressure will be kept below about 300 psi(gage). Pressure within the recycle loop can also increase both with and without the use of make-up carbon dioxide 8 by the generation of carbon dioxide in the acid neutralization reaction (Eqn (8)). Operation of valves 118 and 119 with a timer control system 20 provides for batch treatment of the AMD. Associated interruption in system inflow 17 and outflow 10 can be avoided by incorporating a second pair of pulsed limestone beds. The two pairs of pulsed beds here would be plumbed so that while one pair is in the treatment mode (with recycle), the second pair of pulsed beds is in the mode that displaces treated AMD from the limestone beds by inflowing untreated AMD. Partial mixing of the untreated AMD with treated AMD in the plumbing just upstream of the limestone bed will, when bicarbonate is present in the treated AMD, result in elevated concentrations of carbon dioxide as shown in Eqn (8). It is understood that the two pairs of limestone beds would alternate between the treatment and displacement modes as directed by an appropriate timer control system. A treatment unit prototype incorporating this type of control/operating procedure is shown in FIG. 5, and a schematic of treatment and recharge flows are given in FIG. 6. The system was designed to handle AMD inflow rates of about 1.5 to about 3.5 gallons per minute using ground limestone with the particle size distribution given hereinbefore in Table 2.

The major components of the system include four substantially 10 cm diameter pressure vessels (limestone beds 1, 2, 3 and 4)) charged with granular limestone, a centrifugal pump 5, a packed tower carbonator 6, and a time-relay control system (not shown) used to direct the systems 3-way electric ball valves 7. Two of the four limestone beds (1 and 2 or 3 and 4) receive recycled water alternately from the carbonator 6, under pressure, to maintain high free carbon dioxide concentrations and to accelerate limestone dissolution. Pressure is provided by carbon dioxide entering the carbonator from a pressurized storage tank. System pressure is set by tank regulator pressure. Following treatment of at least two minutes, preferably about four to eight, both limestone beds receiving recycled AMD are isolated from the carbonator by the control system, then vented to the atmosphere, allowing degassing to occur as the treated water is displaced from the limestone beds by incoming AMD allowed at this time to pass through appropriate influent check valve (FIG. 5 (8)). When operating the test apparatus, the carbon dioxide stripping component was tested intermittently by sparging air in effluent AMD samples, thus allowing the effect of carbon dioxide stripping effects on effluent AMD chemistry to be identified (i.e., pH and acidity). Concurrently, the limestone beds in the vented or recharge mode (FIG. 6) are coupled with the carbonator, pressurized, and alternately expanded (fluidized) by recycle pump flow. This concurrent switch over occurs after at least two minutes, preferably four to eight, and a constant discharge from the treatment unit is then maintained. Check valves 9 in FIG. 5 prevent water in the recycle (treatment) loop from mixing with the water being displaced by inflowing AMD.

Performance of the test apparatus shown in FIG. 5 was evaluated using all combinations of the following design variables:

influent acidity: 9; 200; 555 and 1025 mg/l as $CaCO_3$; and carbon dioxide supply tank regulator pressure (system operating pressure): 0; 10; 30; 60 and 100 psig.

Each unique set of operating conditions was replicated once providing a total of 40 observations. The system was also operated using two different treatment cycles (4 min. and 8 min.) at each of three operating pressures (0, 30 and 100 psig) and two influent acidities [9 mg/l and 1,000 mg/l]. In all tests, bed expansion and contraction periods for individual columns were equal (1 min), and AMD was simulated by adding sulfuric acid to well water with the following characteristics:

1. pH 6.7
2. acidity 9 mg/l
3. alkalinity 30 mg/l
4. water temperature 9–10° C.

During tests, bed depth (limestone) after settling was kept at about 60 cm. Performance was assessed by measuring changes in variables 1–4 above across the system during treatment both with and without air stripping of dissolved carbon dioxide. Acidity and alkalinity were measured by titration using standard methods [American Public Health Association, American Waterworks, Associated Water Pollution Control Federation (APHA), 1985]. The pH was measured electrochemically. Least squares regression analysis was used to establish correlations among performance variables and operating conditions. During this series of tests, carbon dioxide stripped from the intermittently obtained discharge samples was not recycled.

Figure 7:
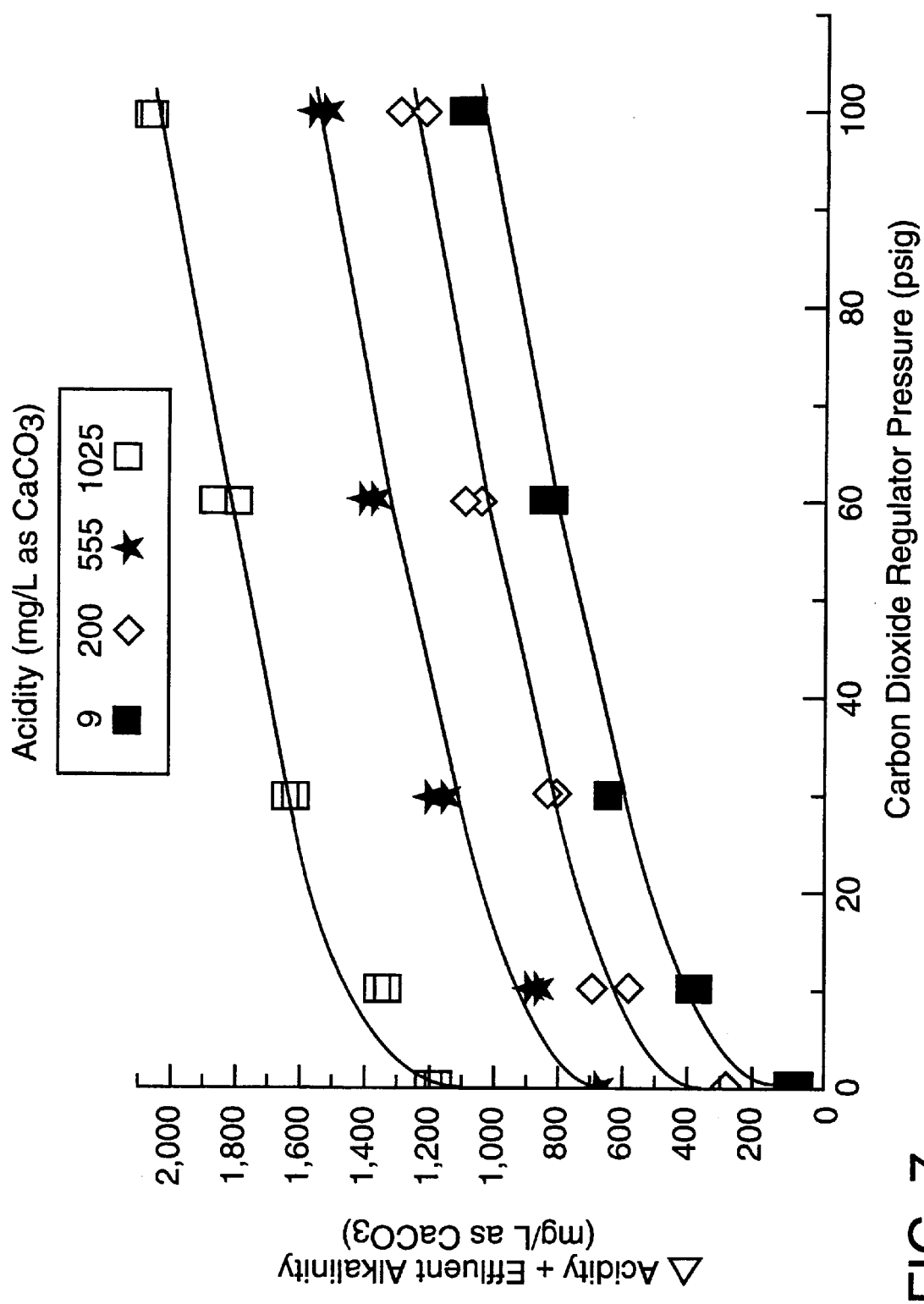
FIG. 7 is a graph showing the effect of carbon dioxide regulator pressure on the mass of limestone dissolved [Δ acidity and effluent alkalinity] during treatment of water representing four levels of acidity.
Figure 8:
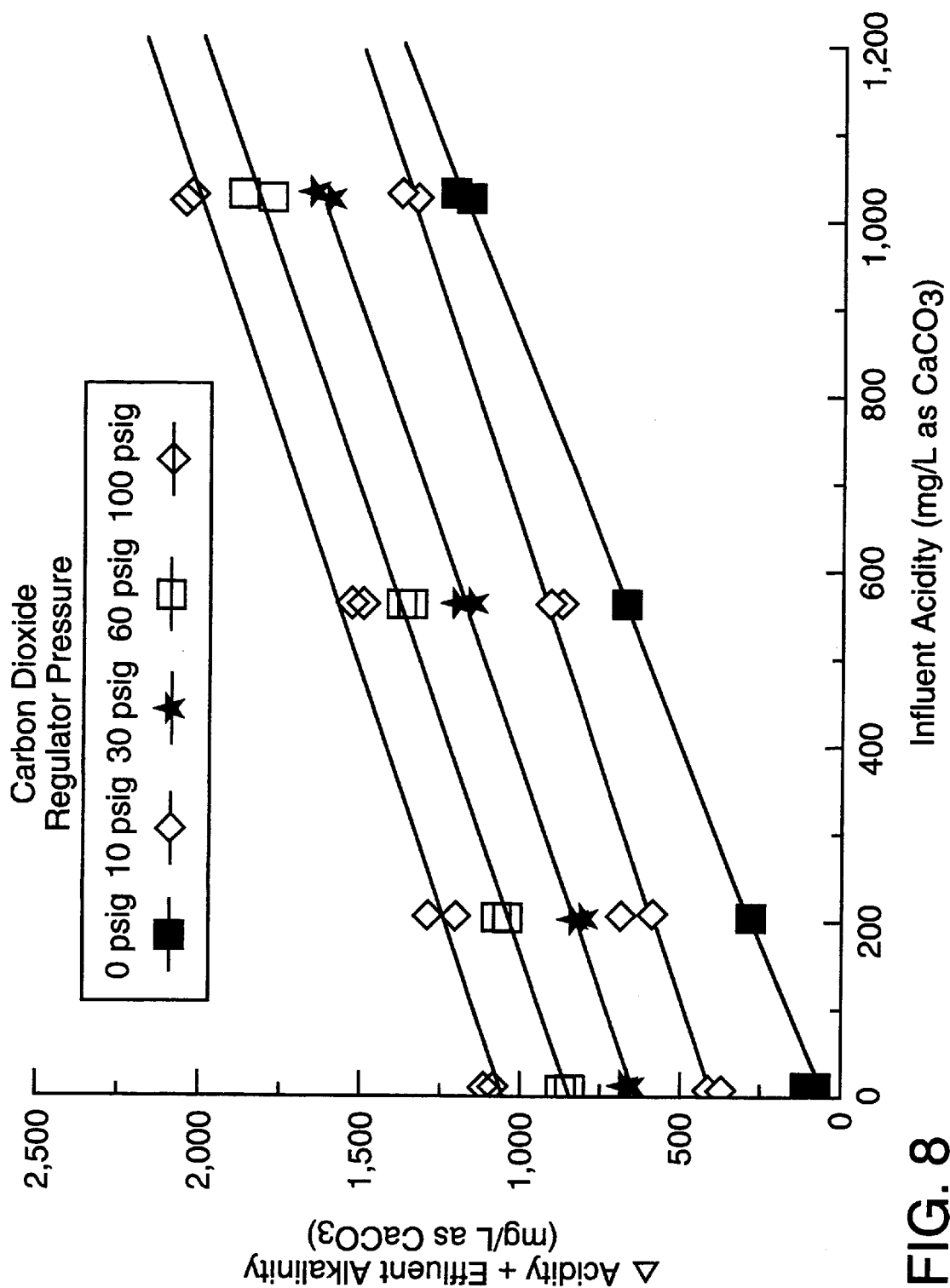
FIG. 8 is a graph showing the effect of inlet acidity on the mass of limestone dissolved [Δ acidity and effluent alkalinity] when operating at five different regulator pressures.
Figure 9:
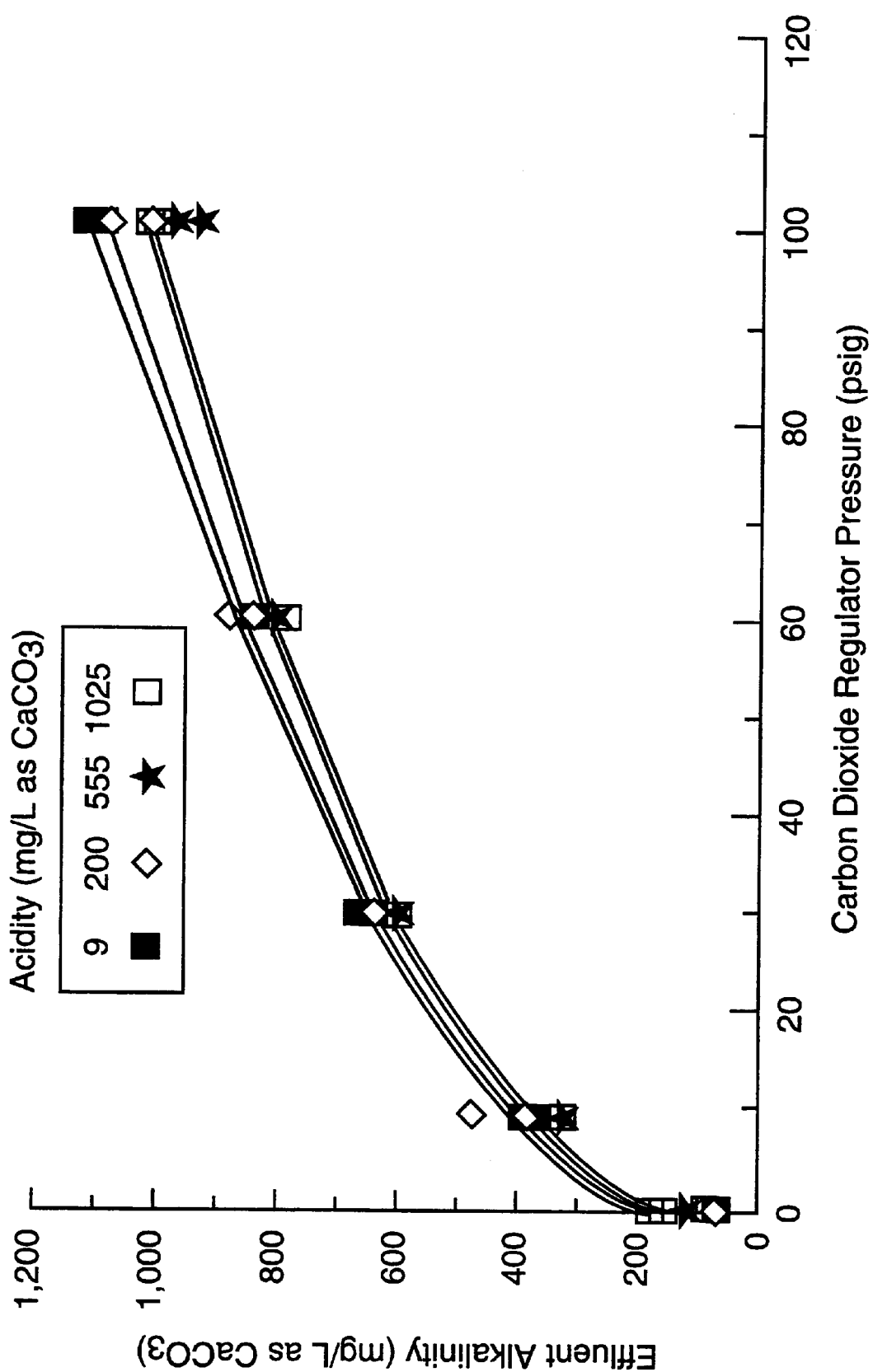
FIG. 9 is a graph showing the effect of carbon dioxide regulator pressure on effluent alkalinity during treatment of waters representing four levels of acidity.

Laboratory tests demonstrated the ability of the new apparatus to accelerate limestone dissolution well beyond rates established with alternative equipment designs. Carbon dioxide pressure (X) and influent acidity effects on effluent alkalinity ($Y_1$) and the mass of limestone dissolved per liter treated ($Y_2$) are shown in FIGS. 7 through 9. The response of both variables to increases in regulator pressure in FIGS. 7 and 9 were fit with the model shown as equation (10)

$$Yi = a + bX^{0.5} \qquad (10)$$

In all cases, coefficients of determination ($r^2$) were high, ranging between 0.980 and 0.997, indicating a strong correlation between carbon dioxide regulator pressure and the rate of limestone dissolution. FIG. 9 shows AMD alkalinity following treatment was relatively insensitive to the acidity of the inflowing AMD. However, FIG. 8 shows the mass of limestone dissolved per liter (Y) increased directly with acidity (X) at each regulator pressure tested following the general linear model:

$$Y = a + bX \qquad (11)$$

Figure 10:
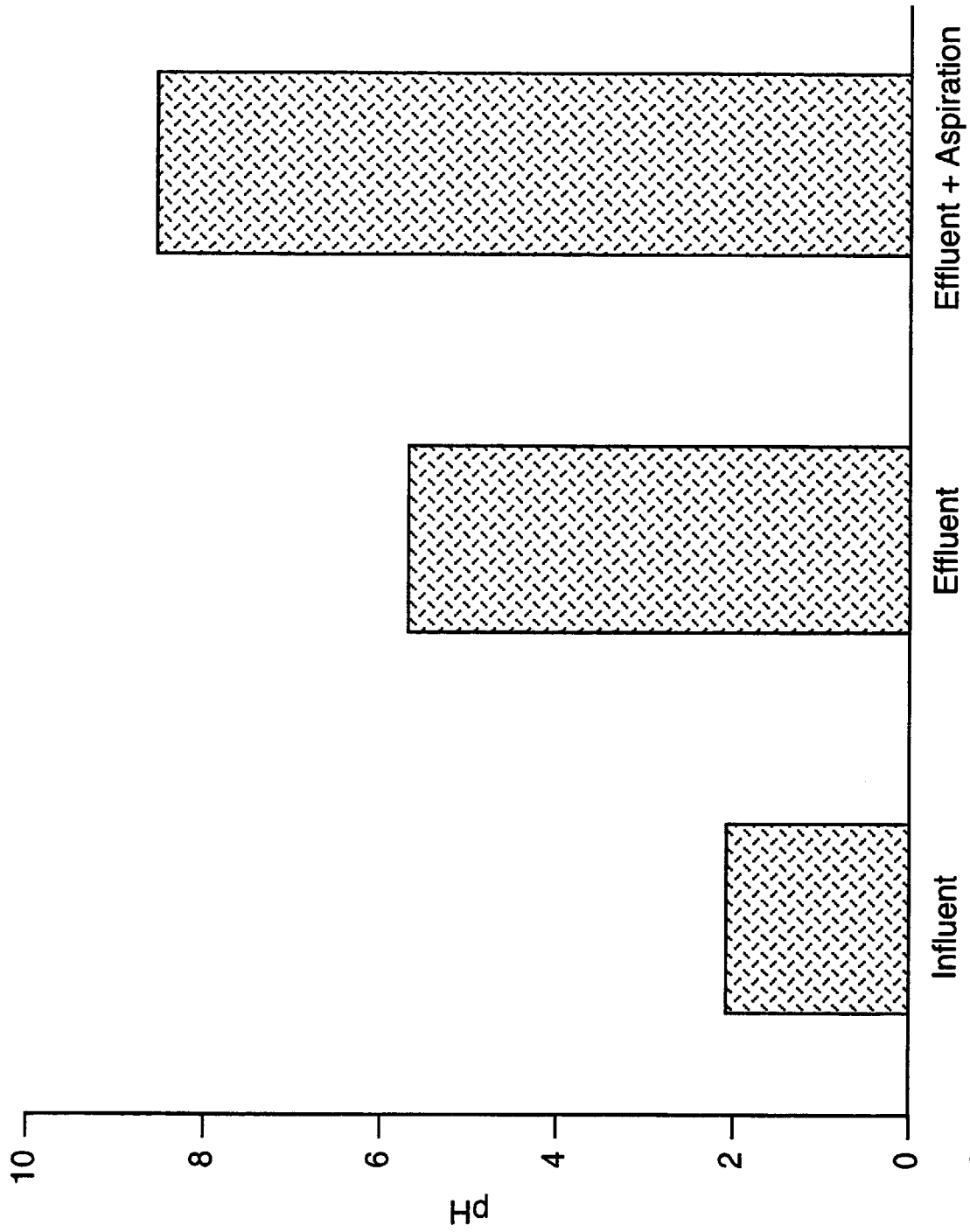
FIG. 10 shows test water pH before and after treatment.

FIG. 10 gives data for the test case where the influent acidity was held at 1024 mg/l, the hydraulic retention time (HRT) was 5.1 min (4 min. cycle) and the carbon dioxide regulator pressure was 100 psi(gage). Note that the pH of the AMD inflow was about 2.1 and this rose during treatment to about 5.6. Stripping the free carbon dioxide from the effluent reduced the acidity from 2147 mg/l to less than 100 mg/l, which allowed the pH to rise to about 8.3. This data demonstrates the importance of stripping carbon dioxide from the limestone column effluent. Note also that alkalinity rose from zero to about 1000 mg/l in the effluent. This concentration is about 25 to 50 times the concentration required to support freshwater fish populations and is about three times the concentration achieved with anoxic limestone drain systems that require HRT's of 15 to 24 hours.

Figure 11:
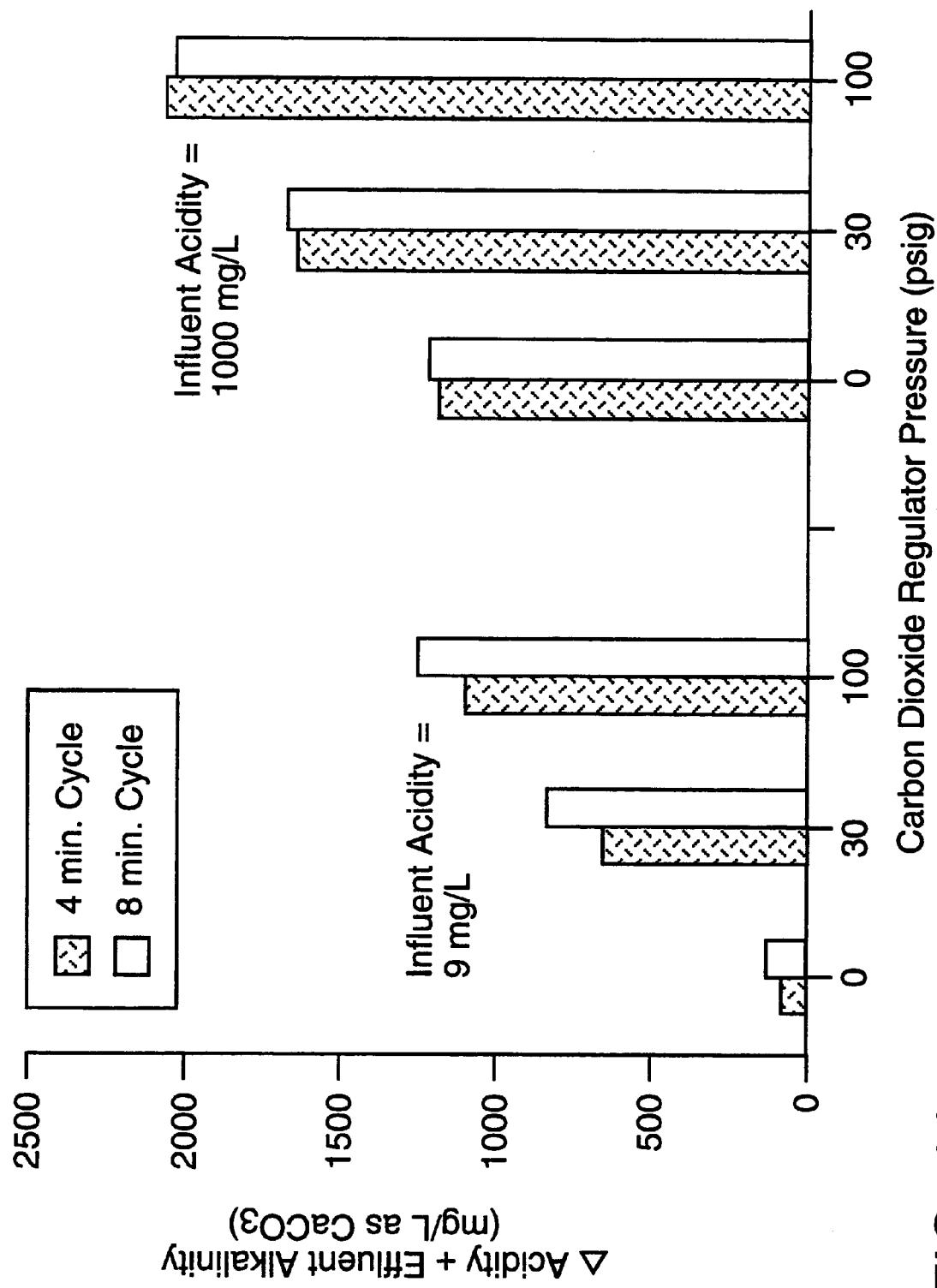
FIG. 11 shows the effect of treatment cycle duration on the mass of limestone dissolved [Δ acidity and effluent alkalinity] when operating at three different regulator pressures and two inlet acidities.

FIG. 11 gives data from the test apparatus when operated with a hydraulic retention time of 5.1 and 10.2 min. (4 min. and 8 min. cycles) at each of two inlet acidities (9 and 100 mg/l) and three carbon dioxide regulator pressures (0, 30 and 100 psi(gage)). Increasing the retention time had little effect on the mass of limestone dissolved (mg/l) with an inflow acidity of 1000 mg/l but did improve dissolution rates with an influent acidity of 9 mg/l. Data in FIG. 11, along with data given in FIGS. 8 and 9, show the test apparatus was capable of eliminating the acidity of, and adding about 40 to 200 mg/l of alkalinity to, the simulated AMD without the need for make up carbon dioxide inflow (carbon dioxide regulator pressure=0).

EXAMPLE I

Given the encouraging results of the laboratory tests conducted with simulated AMD, a series of tests were undertaken to demonstrate the ability of the process to treat AMD in the field. Example 1 gives data for the test apparatus (FIG. 5) operated with a carbon dioxide regulator pressure of 20 psi(gage) and with a 4 min. treatment cycle at Antrim Mine, Antrim, Pa. These data demonstrate the ability of the apparatus to supertreat the AMD despite the presence of dissolved metals known to armor limestone in conventional treatment equipment, i.e., in this case less than 50% of the AMD must be run through the equipment with the product water then blended with untreated water. This capability helps keep capital costs low.

Sample:

| Raw Influent | | | Mix of 50% Untreated AMD Water and 50% Effluent Following $CO_2$ Stripping | |
|---|---|---|---|---|
| pH | 3.18 | | 7.61 | |
| acidity | 250 | mg/l | 10.1 | mg/l |
| alkalinity | 0 | | 137 | mg/l |
| Iron | 25.5 | mg/l | 0.69 | mg/l |
| Manganese | 21.9 | mg/l | 20.8 | mg/l |
| Aluminum | 17.4 | mg/l | 1.89 | mg/l |

EXAMPLE II

Data given below are for a second test at Antrim Mine using a test system like that shown in FIG. 1 and operated at atmospheric pressure, with no make up carbon dioxide flow—only carbon dioxide generated in the reaction shown in Eqn (8) was stripped and recycled. AMD inflow rates here were about 36 times that of earlier tests with the test apparatus shown in FIG. 5. Again, the process tested was effective in treating the AMD despite the presence of dissolved metals.

Sample:

| Influent | | | Effluent Following $CO_2$ Stripping | |
|---|---|---|---|---|
| pH | 3.10 | | 6.40 | |
| acidity | 260 | mg/l | 42.7 | mg/l |
| alkalinity | 0 | mg/l | 45.7 | mg/l |

EXAMPLE III

Examples III and IV give data from tests with the apparatus shown in FIG. 5 and operated at the National Park Service's, Friendship Hill Historic Site, Point Marion, Pa. Here, the AMD inflow had acidities and dissolved metal concentrations that were about three times that of the Antrim Mine AMD. With a cycle duration of 4 min. and a carbon dioxide regulator pressure of 20 psi(gage), Table 3, the process tested was effective at increasing the pH by over 4 units, increasing the alkalinity from zero to 418 mg/l and provided for iron and aluminum removals with precipitation of over 98%. As at the Antrim site, this data demonstrates the ability of the process to supertreat AMD. When operated without make up carbon dioxide, the process was still effective in raising the pH and alkalinity of the AMD beyond minimum required changes (Table 4).

TABLE 3

EXAMPLE III

| Influent | | | Effluent Following $CO_2$ Stripping | |
|---|---|---|---|---|
| pH | 2.39 | | 6.82 | |
| acidity | 903 | mg/l | 0 | |
| alkalinity | 0 | mg/l | 418 | mg/l |
| Iron | 130 | mg/l | 0.16 | mg/l |
| Manganese | 9.3 | mg/l | 8.6 | mg/l |

TABLE 3-continued

EXAMPLE III

| Influent | | | Effluent Following $CO_2$ Stripping | |
|---|---|---|---|---|
| Aluminum | 59.2 | mg/l | 0.69 | mg/l |

TABLE 4

EXAMPLE IV
SAMPLE:

| Influent | | | Effluent Following Air Stripping | |
|---|---|---|---|---|
| pH | 2.57 | | 7.34 | |
| acidity | 1050 | mg/l | 48 | mg/l |
| alkalinity | 0 | mg/l | 148 | mg/l |

As a result of the process of the present invention and the pulsed bed limestone water contactor that accelerates limestone dissolution rates through use of the carbon dioxide pretreatment step, acidities in excess of 1,000 mg/l were neutralized and unusually high levels of alkalinity were achieved during treatment. The ability of the method and apparatus to supertreat the acid mine drainage allows for side stream treatment in many cases.

Figure 12:
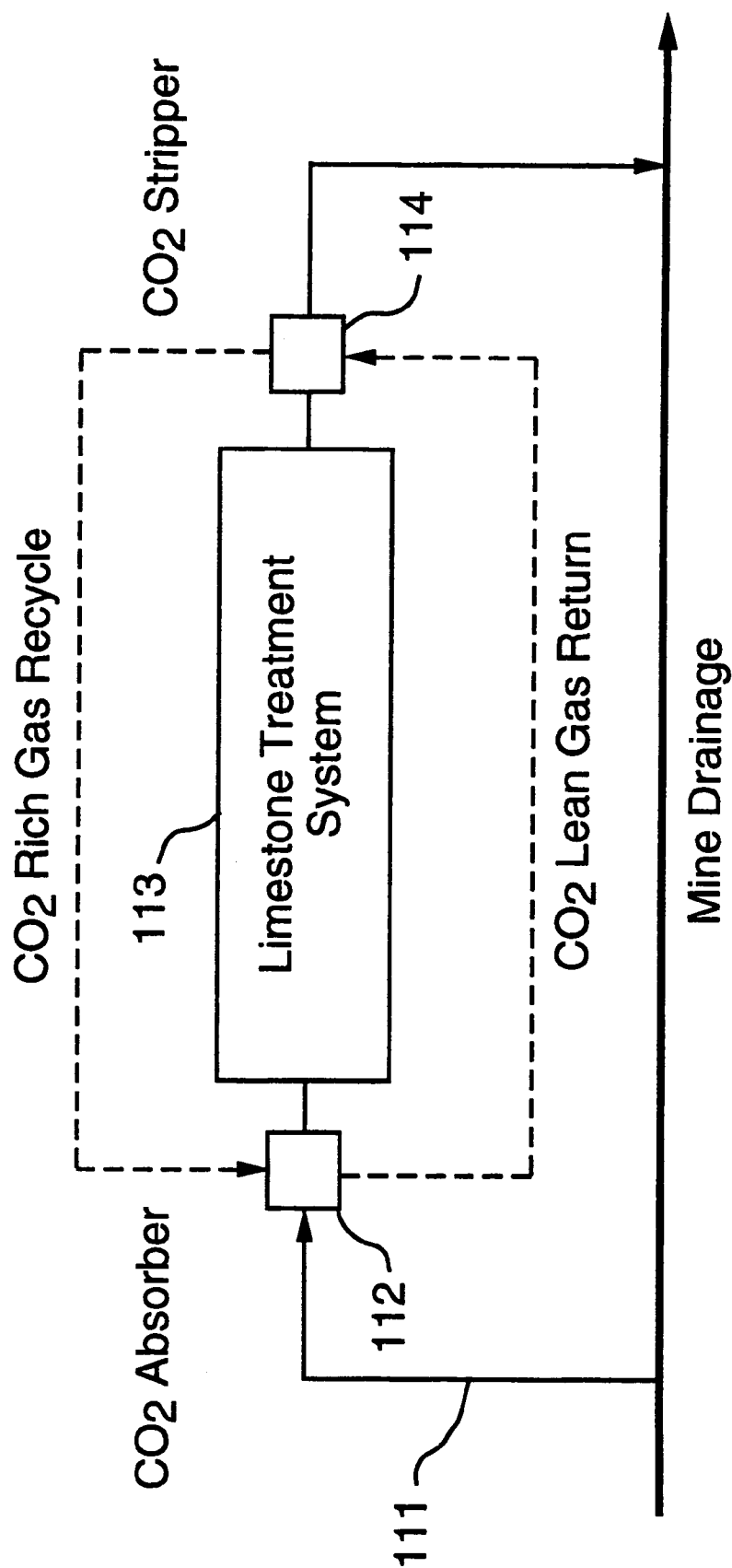
FIG. 12 is a schematic of flows with side stream treatment.

FIG. 12 shows a schematic of flows with side stream treatment of acid mine drainage 111 absorbing $CO_2$ 112, then flowing through a pulsed limestone bed treatment system 113 and the excess $CO_2$ being stripped 114 before the mine drainage is released. Side streaming eliminates the need to dam the entire flow and reduces significantly the size of the reactor and plumbing required for treatment. It reduces capital and site preparation costs.

The process and apparatus described above have met a long-felt need in the mining field where acid mine drainage (AMD) is a significant problem. The limestone aggregates and coarse limestone powders used in the pulsed bed apparatus of the invention have a significantly lower cost than other materials. The increased dissolution rates of limestone achieved in the pulsed bed limestone bed system significantly raises the pH of the effluent and can provide for high levels of [$HCO_3^-$]. This is environmentally important because water with a low pH and poor buffering capacity prevents the reproduction of salmonids and acidification is associated with an increased concentration of toxic metals, often which induces stress, mortality, and threatens food safety of fish products. Buffering the water as was done here also improves the growth conditions for aquaculture, and it has implications for increasing the hardness and alkalinity of very soft water such as those present in waters of North Carolina.

Whereas particular embodiments of the present invention have been described above for purposes of the illustration, it will be evident to those skilled in the art that numerous variations of the details may be made without departing from the invention and defined in the appended claims.

What is claimed is:

1. A method of reducing the acidity in effluent discharges, the method comprising:
    charging said effluent with $CO_2$ in an amount sufficient to accelerate limestone dilution rates;
    intermittently fluidizing and expanding at least one pulsed limestone bed with the charged effluent;
    treating said charged effluent with said limestone in said bed;
    displacing said limestone treated effluent from said bed with untreated charged effluent;
    stripping excess $CO_2$ from said effluent after treatment in said limestone bed; and
    discharging the displaced limestone treated effluent.

2. The method of claim 1, including treating said charged effluent in said limestone bed for at least two minutes.

3. The method of claim 2, including treating said charged effluent in said limestone bed for about 4 to 8 minutes.

4. The method of claim 3 wherein said charging of said effluent is done in at least one stage.

5. The method of claim 4 wherein said stripping of said excess $CO_2$ from said treated effluent is done in at least one stage.

6. The method of claim 5 wherein the stripped excess $CO_2$ is recycled to said untreated effluent.

7. The method of claim 5 wherein the stripped excess $CO_2$ is recycled to partially treated effluent.

8. The method of claim 1 wherein said treated effluent is recycled and mixed with said untreated effluent.

9. The method of claim 1, wherein the step of intermittently fluidizing and expanding at least one limestone bed with said charged effluent includes generally concurrently intermittently fluidizing and expanding at least one other pulsed limestone bed with charged effluent whereby each limestone bed is expanded and fluidized alternately.

10. The method of claim 9, further including alternating between said limestone beds after at least two minutes of treatment in one bed.

11. The method of claim 10, including alternating between said limestone beds after about four to eight minutes in one bed.

12. The method of claim 1, including decreasing the limestone beds sensitivity to limestone armoring by said intermittent fluidizing of said limestone beds.

13. The method of claim 12, including raising the pH of said treated effluent to at least 5.

14. The method of claim 13, including neutralizing mineral acidities in said effluent in excess of about 1,000 mg/l.

15. The method of claim 10, including venting stripped $CO_2$ from said treated effluent beds into the environment.

* * * * *

UNITED STATES PATENT AND TRADEMARK OFFICE
CERTIFICATE OF CORRECTION

PATENT NO. : 5,914,046
DATED : June 22, 1999
INVENTOR(S) : WATTEN

It is certified that error appears in the above-indentified patent and that said Letters Patent is hereby corrected as shown below:

Col. 5, line 19, please delete "A", and substitute -- $\Delta$ -- therefor.

Col. 6, equation (5), please delete the equation in its entirety, and substitute the following therefor -- $H_2O + CO_2 \Leftrightarrow H_2CO_3 \Leftrightarrow H^+ + HCO_3^-$ --.

Col. 7, equation (8), please delete the equation in its entirety, and substitute the following therefor -- $HCO_3^- + H^+ \Leftrightarrow CO_2 + H_2O$ --.

Signed and Sealed this

Twenty-seventh Day of March, 2001

Attest:

NICHOLAS P. GODICI

*Attesting Officer*      *Acting Director of the United States Patent and Trademark Office*